US012788004B2

(12) United States Patent
Kibel et al.

(10) Patent No.: US 12,788,004 B2
(45) Date of Patent: Nov. 10, 2026

(54) SHARK DETERRENT DEVICE AND METHOD

(71) Applicant: FishTek Marine Limited, Totnes (GB)

(72) Inventors: Ben Kibel, Totnes (GB); Pete Kibel, Totnes (GB); Dave Thomas, Totnes (GB)

(73) Assignee: FishTek Marine Limited, Totnes (GB)

( * ) Notice: Subject to any disclaimer, the term of this patent is extended or adjusted under 35 U.S.C. 154(b) by 0 days.

(21) Appl. No.: 17/742,669

(22) Filed: May 12, 2022

(65) Prior Publication Data

US 2022/0264870 A1 Aug. 25, 2022

Related U.S. Application Data

(63) Continuation of application No. PCT/GB2020/052888, filed on Nov. 13, 2020.

(30) Foreign Application Priority Data

Nov. 13, 2019 (GB) ..................................... 1916517

(51) Int. Cl.
*A01M 29/24* (2011.01)
*A01K 97/00* (2006.01)

(52) U.S. Cl.
CPC ............. *A01M 29/24* (2013.01); *A01K 97/00* (2013.01)

(58) Field of Classification Search
CPC ....... A01M 29/24; A01K 79/02; A01K 79/00; G06F 11/0757
See application file for complete search history.

(56) References Cited

U.S. PATENT DOCUMENTS 3,822,403 A 7/1974 Coleman et al.
4,211,980 A * 7/1980 Stowell .................. A01K 79/02
455/100

(Continued)

FOREIGN PATENT DOCUMENTS

CN 107205357 A * 9/2017 ............. A01K 3/005
DE 102013112008 B4 * 10/2019 ............ A01M 29/24

(Continued)

OTHER PUBLICATIONS

Chmiel, Marjee. "Picking on Plastics." Smithsonian Science Education Center, Mar. 29, 2016, https://ssec.si.edu/stemvisions-blog/picking-plastics#:~:text=Plastics%20are%20typically%20waterproof%20and,containers%20such%20as%20ceramic%20jugs. (Year: 2016).*

(Continued)

*Primary Examiner* — David J Parsley
*Assistant Examiner* — Angelica Alejandra Almeida Bonnin
(74) *Attorney, Agent, or Firm* — Alley IP

(57) ABSTRACT

A device and associated method for reducing depredation of fish by sharks, the device comprising: a waterproof housing; a power source within the housing; a first electrode disposed on an exterior of the housing at a first end of the housing; a second electrode disposed on the exterior of the housing at a second end of the housing opposite the first end of the housing; and a controller powered by the power source and configured to supply a sequence of electrical pulses between the first electrode and the second electrode, each electrical pulse in the sequence of electrical pulses spaced from each adjacent pulse by at least 3 seconds.

7 Claims, 7 Drawing Sheets

(56) References Cited

U.S. PATENT DOCUMENTS

| | | | | | |
|---|---|---|---|---|---|
| 4,580,525 | A * | 4/1986 | Marzluf | A01K 79/02 | 119/220 |
| 5,566,643 | A * | 10/1996 | Charter | A01K 79/02 | 119/220 |
| 6,307,480 | B1 * | 10/2001 | Sheldon | G06F 1/30 | 327/143 |
| 10,089,164 | B2 * | 10/2018 | Curtis | G06F 11/0757 | |
| 2003/0051674 | A1 * | 3/2003 | Leblanc | A01K 79/02 | 119/220 |
| 2004/0049705 | A1 * | 3/2004 | Liebenow | G06F 1/3218 | 713/320 |
| 2007/0199515 | A1 * | 8/2007 | Cheron | A01K 91/00 | 119/220 |
| 2011/0174235 | A1 * | 7/2011 | Vinano | A01K 79/02 | 119/712 |
| 2012/0031343 | A1 * | 2/2012 | DeLuze | B63C 9/00 | 119/220 |
| 2018/0070556 | A1 | 3/2018 | Hagen et al. | | |

FOREIGN PATENT DOCUMENTS

| | | | | |
|---|---|---|---|---|
| GB | 2505992 | A * | 3/2014 | A01M 31/002 |
| JP | 2013-169170 | | 9/2013 | |
| JP | 2019-68766 | | 5/2019 | |
| JP | 6582307 | | 10/2019 | |
| JP | 6582307 | B2 * | 10/2019 | |
| KR | 10-2011-0099820 | | 9/2011 | |
| KR | 20160032407 | | 3/2016 | |
| KR | 20160032407 | A * | 3/2016 | |
| WO | WO-2008046116 | A2 * | 4/2008 | A01K 79/02 |
| WO | 2012135394 | | 10/2012 | |
| WO | WO-2012135394 | A2 * | 10/2012 | A01K 79/02 |
| WO | WO-2014190385 | A1 * | 12/2014 | A01K 79/02 |
| WO | 2016201517 | | 12/2016 | |
| WO | WO-2016201517 | A1 * | 12/2016 | A01K 79/02 |
| WO | WO-2018083449 | A1 * | 5/2018 | A01K 79/02 |

OTHER PUBLICATIONS

Egeberg, Channing A., et al. "Not all electric shark deterrents are made equal: Effects of a commercial electric anklet deterrent on white shark behaviour." PLOS ONE, vol. 14, No. 3, 2019, https://doi.org/10.1371/journal.pone.0212851. (Year: 2019).*

"Electrode." Collinsdictionary.com, Collins, https://www.collinsdictionary.com/us/dictionary/english/electrode. Accessed Oct. 17, 2023. (Year: 2023).*

UKIPO, Search Report in corresponding GB application GB1916517.4, May 5, 2020.

WIPO, International Search Report and Written Opinion in corresponding PCT application PCT/GB2020/052888, Mar. 5, 2021.

JPO, Office Action in corresponding JP application 2022-527964, Aug. 20, 2024.

KIPO, Office Action in corresponding KR Application 10-2022-7017207, Nov. 26, 2025.

* cited by examiner

SHARK DETERRENT DEVICE AND METHOD

RELATED APPLICATIONS

This application claims the benefit under 35 U.S.C. § 120, and is a continuation, of co-pending International Application PCT/GB2020/052888, filed Nov. 13, 2020 and designating the US, which claims priority to GB Application 1916517.4, filed Nov. 13, 2019, such GB Application also being claimed priority to under 35 U.S.C. § 119. These GB and International applications are incorporated by reference herein in their entireties.

FIELD

The present invention relates generally to a device for deterring sharks and a method of deterring sharks and finds particular, although not exclusive, utility in long line fishing.

BACKGROUND

Sharks and other sea creatures, including fish such as rays, are known to depredate (i.e. steal) fish from nets and longlines during the human act of fishing (e.g. for tuna or swordfish).

Sharks and some other marine species have electroreceptor organs for detecting electric stimuli. In sharks the electroreceptor organs are known as the ampullae of Lorenzini, which are used to detect electromagnetic fields that all living things produce. This helps sharks find prey.

It is known to try to use electrical currents passed through seawater to deter sharks from regions of human activity, particularly around divers. However, as the electrical field around a dipole decreases at least as fast as the inverse of the cube of the distance from the dipole (rather than the inverse of the square of the distance), it is conventionally considered necessary to have a constant electrical current, or very closely spaced pulses in order to effectively deter sharks from approaching between pulses.

SUMMARY

As can be appreciated, a higher electrical current will have a larger range and is therefore desirable. Accordingly, the power consumption required by such deterrents is very high, and is prohibitive in small portable devices.

According to a first aspect of the present invention, there is provided a device for reducing depredation of fish by sharks, the device comprising: a waterproof housing;

a power source within the housing; a first electrode disposed on an exterior of the housing at a first end of the housing; a second electrode disposed on the exterior of the housing at a second end of the housing opposite the first end of the housing; and a controller powered by the power source and configured to supply a sequence of electrical pulses between the first electrode and the second electrode, each electrical pulse in the sequence of electrical pulses spaced from each adjacent pulse by at least 3 seconds.

In this way, the inventor found that an effective deterrent from depredation may be created with a much lower energy consumption that previously considered possible.

Each electrical pulse in the sequence of electrical pulses may be spaced from each adjacent pulse by at least 4 s, 5 s, 6 s, 8.5 s and/or 12 s.

Each electrical pulse in the sequence of electrical pulses may be spaced from each adjacent pulse by at most 3 s, 4 s, 5 s, 6 s, 8.5 s and/or 12 s.

Each electrical pulse may have a voltage between 1V and 50V, in particular between 10V and 45V, more particularly between 20V and 40V, for example approximately 20V, 25V, 30V and/or 40V.

Each electrical pulse may have a duration of between 1 ms and 10 ms, in particular between 1.5 ms and 5 ms, for example approximately 1.5 ms, 3 ms and/or 5 ms.

The second electrode may be spaced from the first electrode by between 5 Cm and 30 cm, in particular between 8 cm and 20 cm, more particularly between 10 cm and 15 Cm, for example approximately 12 cm.

The housing may be waterproof to a depth of at least 1 m, 5 m, 10 m, 100 m, 500 m, 1000 m and/or 3000 m.

The power source may comprise at least one battery, for instance only one, two, three, four or more batteries. The batteries may be for instance AA, AAA, C or D batteries, or any other suitable form of batteries.

The device may be further configured to activate upon submersion in water.

The device may further comprise a pair of water contact pins in electrical communication with the controller and arranged to project out of the housing such that water present between the projecting ends of the pins completes an electrical circuit causing device to activate. Water between the projecting ends of the pins may mean salt water and/or sea water, and optionally may not include freshwater.

The water contact pins may project out of the housing by less than 5 mm, 4 mm, 3 mm, 2 mm and/or 1 mm.

The respective electrodes may comprise the water contact pins. That is, the first and second electrodes may be dual purpose, for water detection and pulse emission/reception.

The water contact pins and/or electrodes may extend through the housing by virtue of an interference fit to prevent water ingress. For instance, at least 5N of force may be required to located them within respective holes in the housing (or portions of the holes), in particular at least 20N, more particularly at least 30N, 50N or 70N; alternatively and/or additionally, the pins may be glued or otherwise sealed within the respective holes (e.g. by rubber tubing or with O-rings).

The first and second electrodes may comprise plates, e.g. flat plates, to maximise electrical conduction through water.

According to a second aspect of the present invention, there is provided a method of reducing depredation of fish by sharks, the method comprising: providing the device according to any preceding claim; supplying a sequence of electrical pulses between the first electrode and the second electrode, each electrical pulse in the sequence of electrical pulses spaced from each adjacent pulse by at least 3 seconds.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
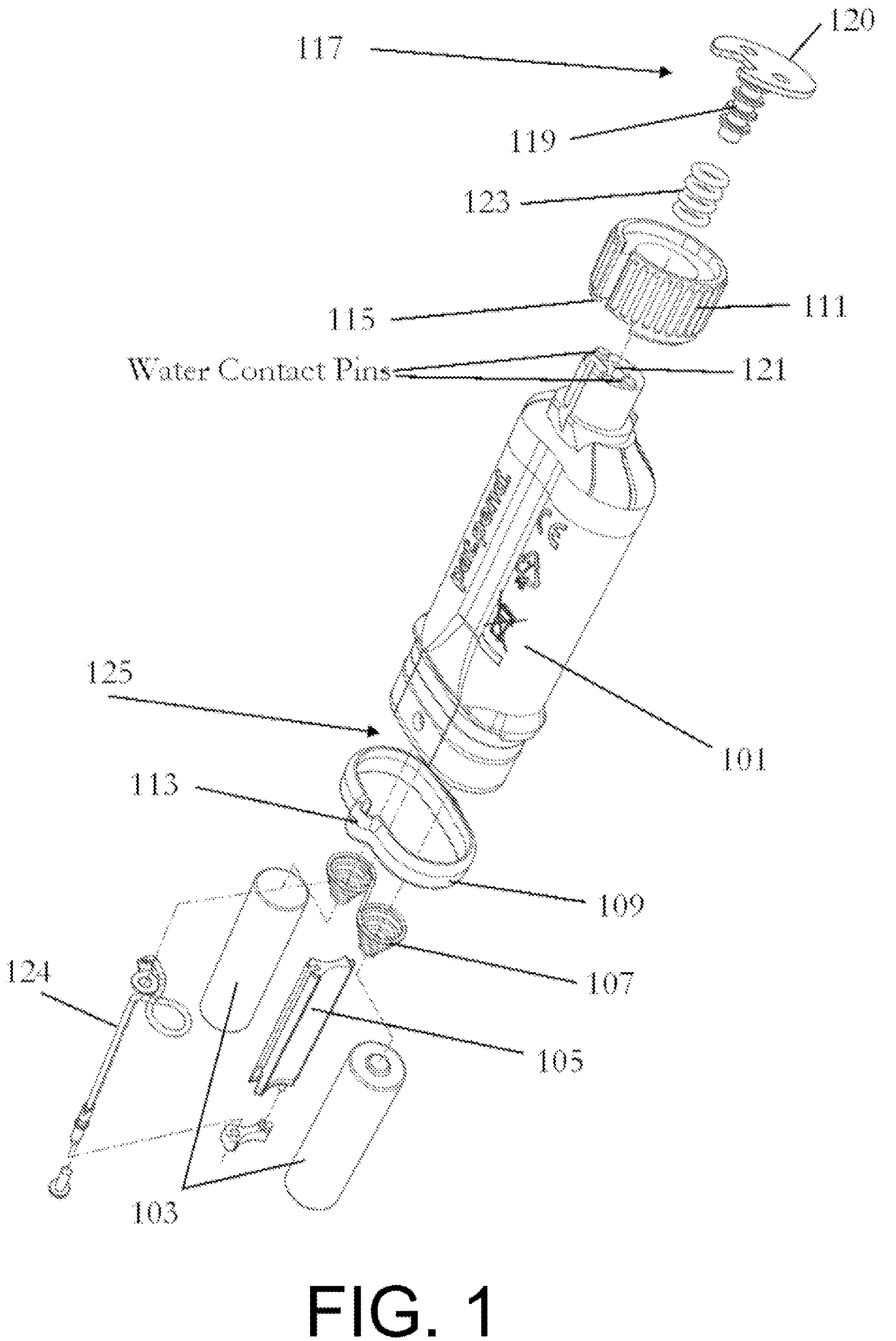
FIG. 1 is a perspective view of a first part of a device for deterring sharks.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a perspective exploded view of a first part of a device for deterring sharks comprising a first body portion 101, inside which are held two AA batteries 103, held apart by a divider 105 which also acts to provide structural rigidity to the first body portion 101 (to prevent collapse thereof under pressure). The negative terminal of one of the batteries 103 is connected to the positive terminal of the other one of the batteries 103 by coiled spring conductor 107.

Axially disposed on the first body portion 101 are a first line connector 109 and a second line connector 111, each having a respective hole 113, 115 through which a fishing line may be connected such that the device lies against the fishing line and aligned therewith.

A first electrode 117, comprising an external plate portion 119 and an internal shaft portion 120 is received within a through-hole 121 in the first body portion 101. Water ingress through the through-hole 121 is prevented by a series of O-rings 123 around the shaft portion 119. An electrical wire 124 connects between the first electrode 117, through the interior of the first body portion 101 to an opposing end of the first body portion where an opening 125 into the first body portion is found.

Figure 2:
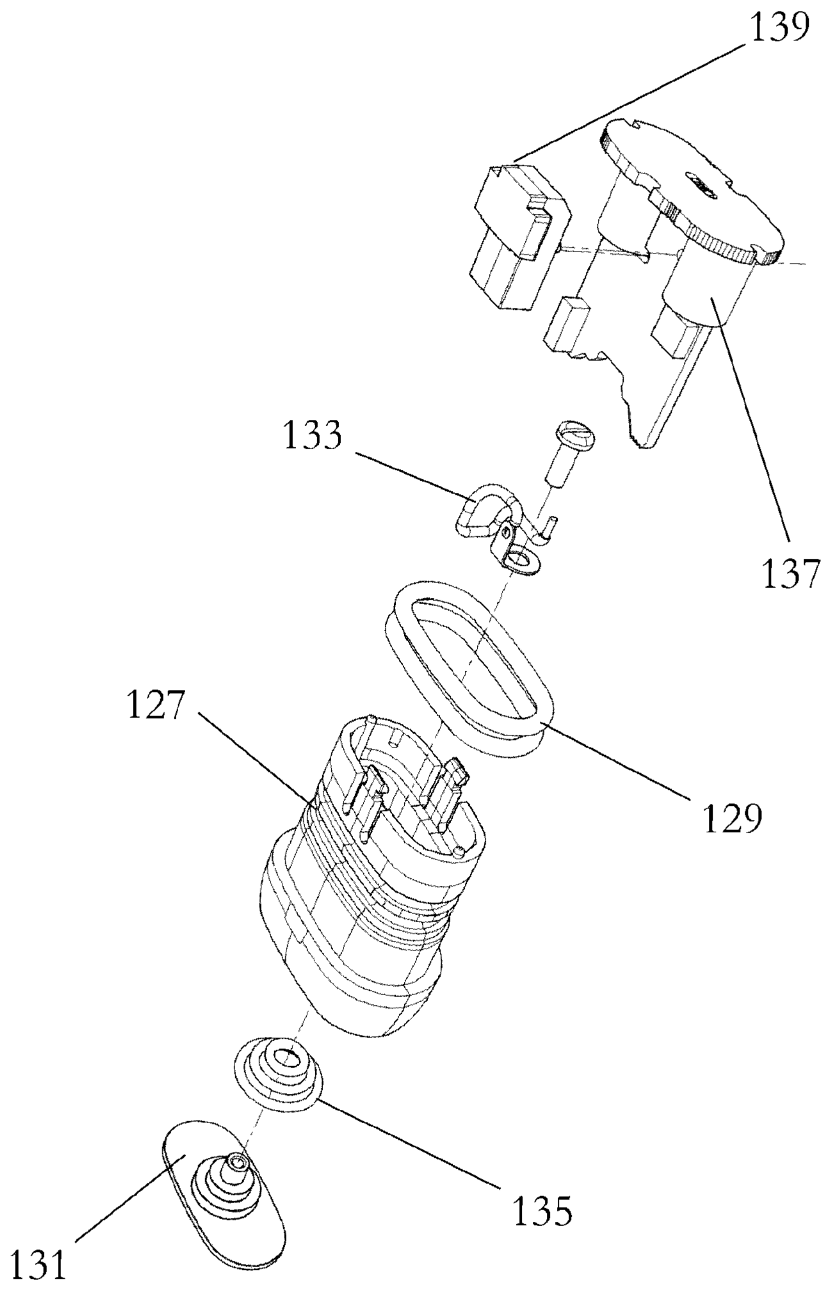
FIG. 2 is a perspective view of a second part of the device of FIG. 1.

FIG. 2 is a perspective exploded view of a second part of the device of FIG. 1 for sealing the opening 125, comprising a second body portion 127, or cap, insertable into the opening 125, around which a pair of O-rings 129 are provided. A second electrode 131 is provided at one end of the second body portion 127, comprising a plate with a protrusion that extends through the cap 127 to a further electrical wire 133. Water ingress from around the second electrode 131 is prevented by a series of O-rings 135.

The further electrical wire 133 connects the second electrode 131 to a controller/circuit board element 137 that, when sealing the opening 125 is electrically connected to the batteries 103 and electrical wire 124. The element 137 is reinforced either side within the cap by blocks 139 that prevent collapse of the cap under pressure.

Figure 3:
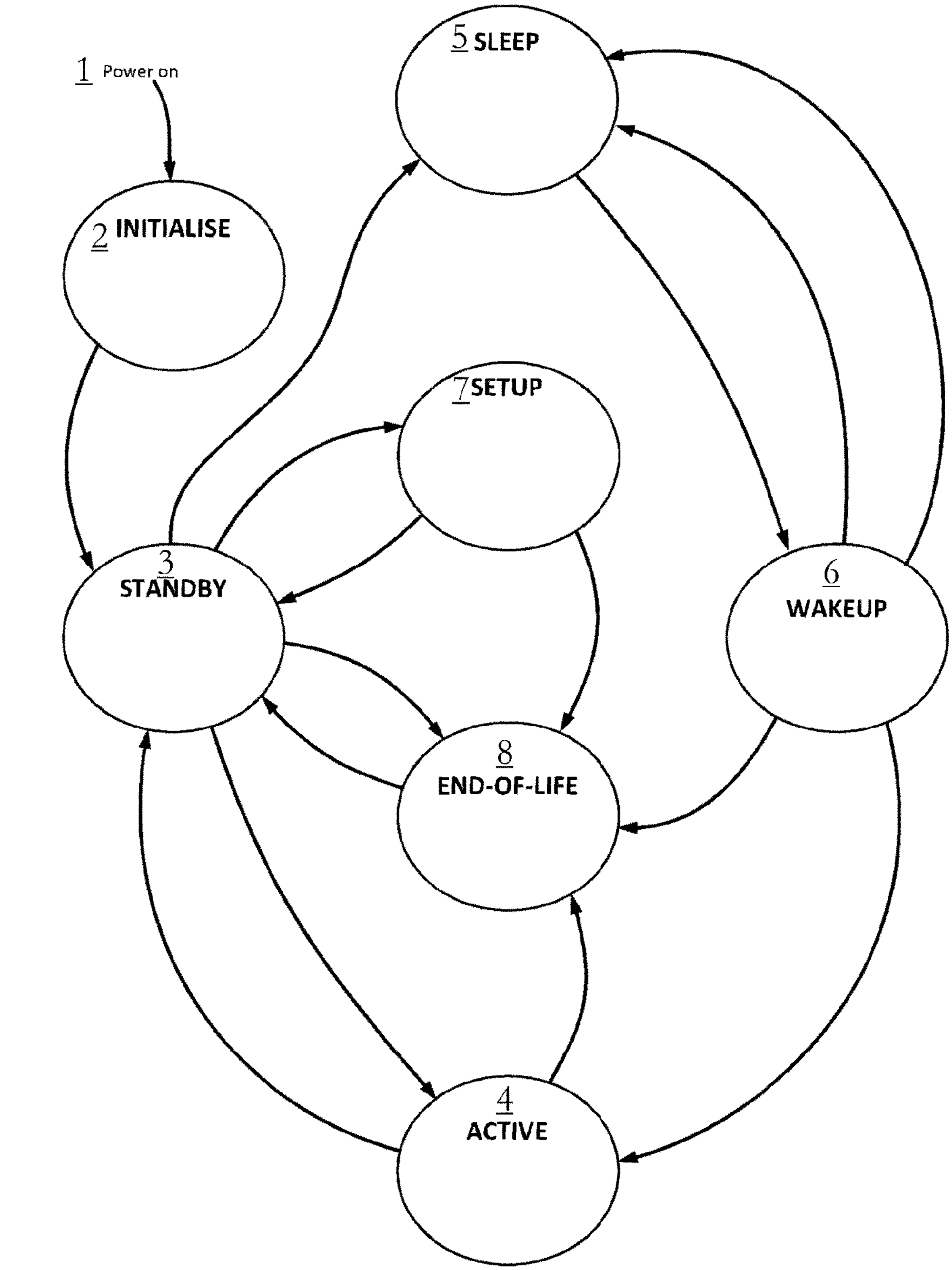
FIG. 3 is a flow diagram of the functional states of a device for deterring sharks.

FIG. 3 is a flow diagram of the functional states of a device for deterring sharks.

At 1, the device is powered on (e.g. the batteries are inserted), and immediately enters the Initialise state 2. This is a high power (16 MHz clock), short duration state. The Initialise state 2 involves the initialisation of the various registers in the microcontroller and a rapid LED flash sequence to indicate that the unit is operational.

After initialisation, the device immediately enters the Standby state 3, which is a predominantly low power state (31 kHz clock). Periodically the device tests for water, a control signal (such as an Infra-Red signal), and the battery state.

If water is detected, the unit enters the Active state 4, which is a high power state (16 MHz clock) where the unit repeatedly generates voltage pulses into the water. It also periodically tests the battery condition and for the continued presence of water. If no water is detected, the unit returns to the Standby state 3.

In Standby state 3, if no water is detected, no control signal is detected and the battery state is deemed to be OK, over a time period of 'x' minutes, the device will enter the Sleep state 5, in which power is conserved by operating only a watchdog timer. When the watchdog timer timeouts (at approximately multiple minute intervals that can be set by a user), the unit enters the Wakeup state 6, in which the device test for water and test the battery. Optionally, the Wakeup state 6 may permit testing for a control signal, but this is not shown in the figure.

The Wakeup state 6 is a high power state (16 MHz clock) where preferably the unit tests the state of the battery first and only if OK will it test for water. If water is detected the device enters the Active state 4.

If a control signal is detected, for instance in the Standby state 3 (or optionally the Wakeup state 6) the device enters the Setup state 7.

The Setup state 7 is a high power state (16 MHz clock) where incoming control signals are received and decoded. The various parameters in memory are then set according to the signals received.

For example:—

Mode 1 corresponds to 40V pulses of 1.5 ms separated by 4 s.

Mode 2 corresponds to 40V pulses of 1.5 ms separated by 12 s.

Mode 3 corresponds to 40V pulses of 5 ms separated by 12 s.

Mode 4 corresponds to 40V pulses of 5 ms separated by 5 s.

Mode 5 corresponds to 30V pulses of 1.5 ms separated by 6 s.

Mode 6 corresponds to 25V pulses of 1.5 ms separated by 12 s.

Mode 7 corresponds to 40V pulses of 3 ms separated by 12 s.

Mode 8 corresponds to 40V pulses of 3 ms separated by 8.5 s.

Mode 9 corresponds to 20V pulses of 3 ms separated by 12 s.

If after 10 seconds no control signal is detected in the Setup state 7, the device transitions back to the Standby state 3.

From any state, if an end-of-life battery condition is detected, then the device enters the End-of-life state 8. This is a high power state (16 MHz clock) which usually lasts indefinitely. The most usual way to escape from this state is to replace the batteries. A battery condition test is periodically carried out and if the battery is found to be OK then the unit enters the Standby state. This provides a means of recovery if the unit has entered the End-of life state due to a momentary battery disconnection occurring (for example if the unit is dropped on its end, compressing the battery contact springs) exactly at the point when a battery condition test was in progress.

The voltage and current thresholds used by the firmware to detect the various conditions are as follows:—

Low battery voltage: Battery voltage <2.40V

End-of-life battery voltage: Battery voltage <2.15V

Not end-of-life battery voltage: Battery voltage >2.40V

Water detected: Output current >625 mA

Water not detected: Output current <625 mA

Short-circuit output: Output current >14.375 A

Note that in all cases when generating output pulses (either shark-deterrent pulses or water presence testing pulses), the hardware of the microcontroller will detect an overcurrent (e.g. short circuit) condition and will immediately truncate the pulse without firmware intervention to avoid damaging the device. The firmware is able to determine whether this has occurred after each pulse. Hence in Active mode 4, no specific action is taken by the state machine if a short-circuit condition occurs, but hardware intervention will occur on a pulse-by-pulse basis.

The length of time elapsing before the transition to the Sleep state 5 from the Standby state 3 depends upon the state immediately before the Standby state. These times are:—

From Initialise state 2: 15 minutes.

From Active state 4: 2 hours.

From Setup state 7: 15 minutes.

From End-of-life state 8: 15 minutes.

If a low battery voltage is detected (indicative of approximately 8 hours of active operation remaining), an LED indication is generated but no state change results.

Standby is the only state when the infrared detector is powered on and its current consumption is relatively high. Hence the duration of the Standby state is minimised to conserve battery life. At several (infrequent) points during operation in Standby state, operation reverts to high power (16 MHz clock) for functional reasons.

Figure 4:
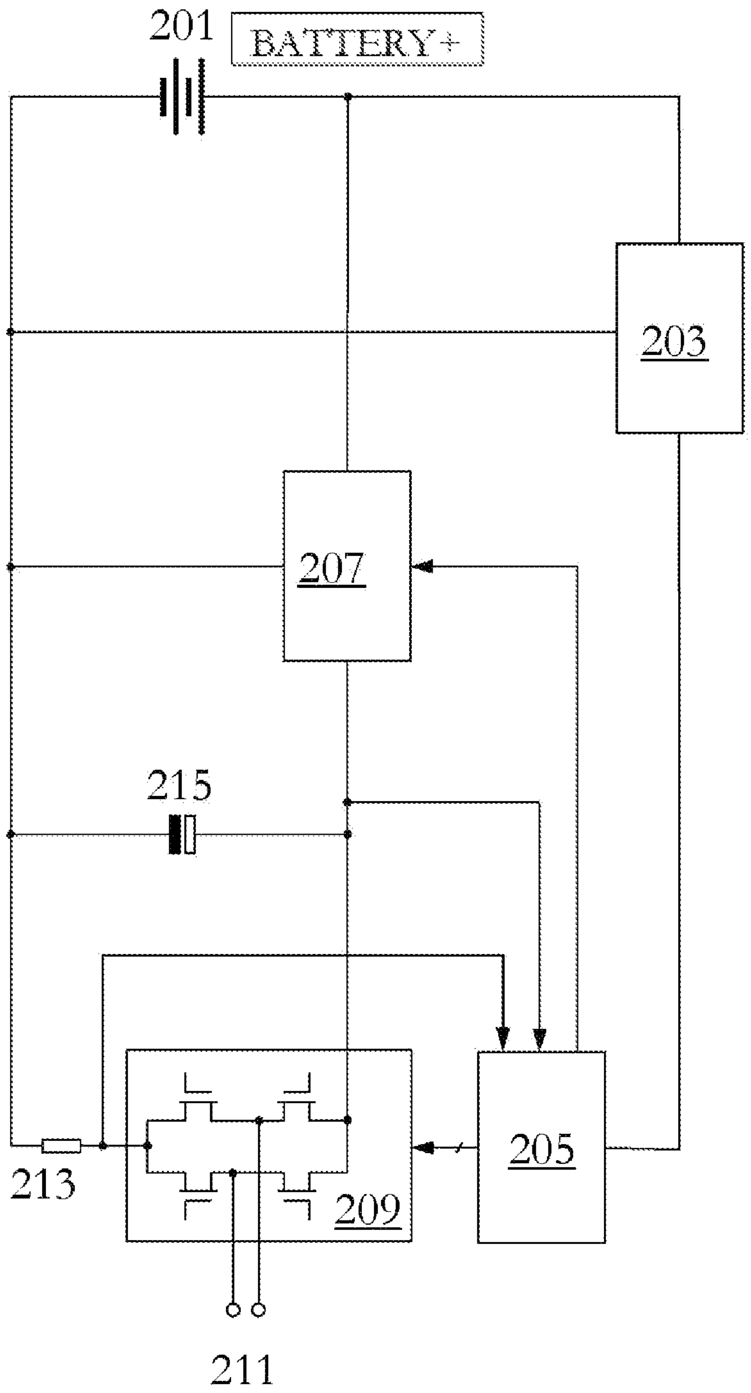
FIG. 4 is a block diagram of the operational components of a device for deterring sharks.

FIG. 4 is a block diagram of the operational components of a device for deterring sharks. A battery 201 provides power to a voltage regulator 203, which outputs a constant 2V to a microcontroller 205. The microcontroller 205 controls a voltage boost circuit 207 that can output a maximum of 40V to a transistor H-bridge 209 that drives the output electrodes 211. The microcontroller 205 monitors the voltage feedback produced by the voltage boost circuit 207, and monitors the current feedback via a current sense resistor 213 connected in series with the transistor H-bridge 209. A charge storage capacitor 215 is also provided in parallel with the transistor H-bridge 209.

Figure 5A:
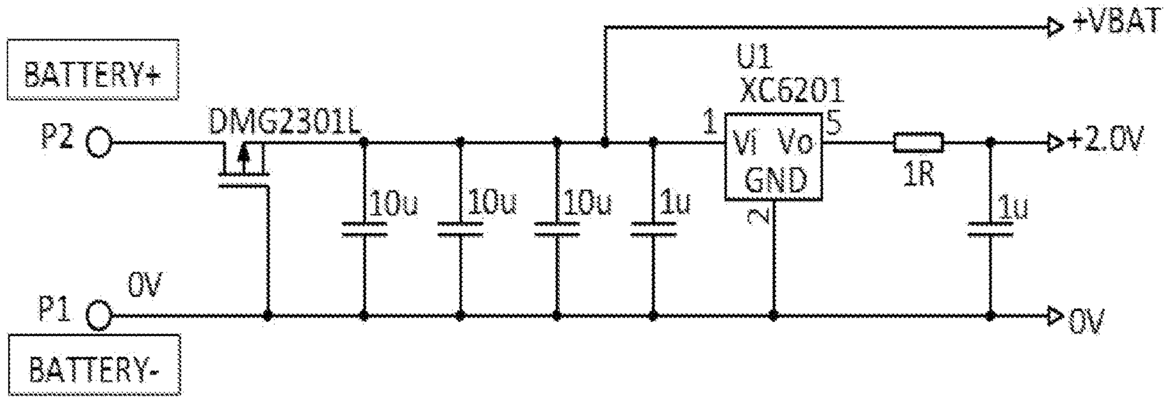
FIGS. 5A-5E are wiring diagrams of the operational components of a device for deterring sharks.

FIGS. 5A to 5E show more detail of the operational components of a device for deterring sharks. Various labels are used to show how the components of each figure may be connected to each other figure. More specifically, the following connections may be formed: +VBAT of FIG. 5A to +VBAT of FIG. 5D; HVCLK of FIG. 5B to HVCLK of FIG. 5E; BATTST of FIG. 5B to BATTST of FIG. 5D; VBAT of FIG. 5B to VBAT of FIG. 5D; BRIDGE2 of FIG. 5B to BRIDGE2 of FIG. 5E; along with IRSIG and IREN of FIG. 5B to the respective terms of FIG. 5C. In FIG. 5A, inputs from the battery P1 and P2, are passed to a voltage regulator U1 to provide three outputs: the battery voltage +VBAT, a constant +2V signal and a ground signal OV. It is to be appreciated that the voltage values provided are for example only, and different values may be chosen, for instance if the +VBAT voltage is less than or equal to 2V, the voltage regulator would only be able to output a constant voltage signal of a lower value than that shown.

Figure 5B:
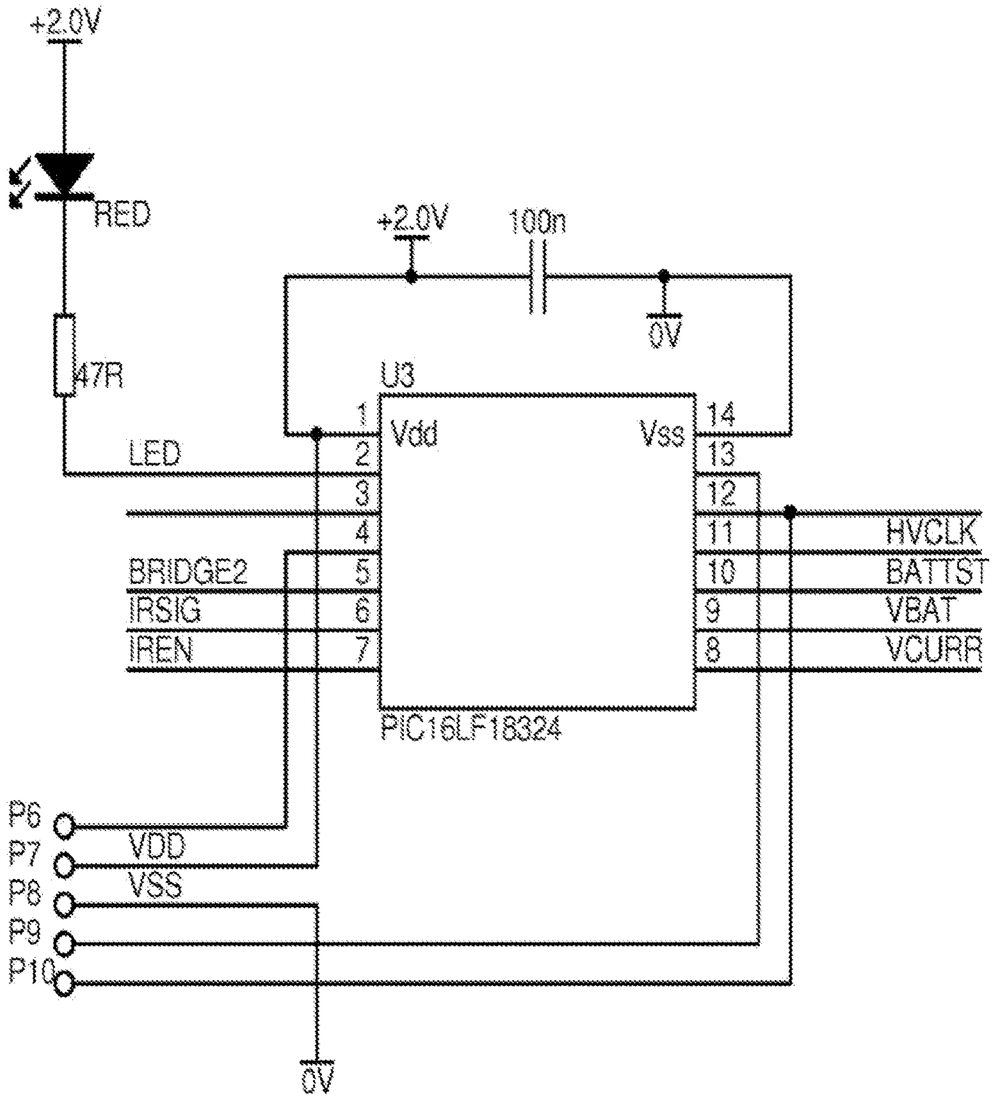

FIG. 5B shows an input from the +2V line, and five further control inputs P6, P7, P8, P8 and P10 being passed to a microcontroller U3 with fourteen output pins. As shown in FIG. 5B, the microcontroller U3 may be a PIC16LF18324 microcontroller.

Figure 5C:
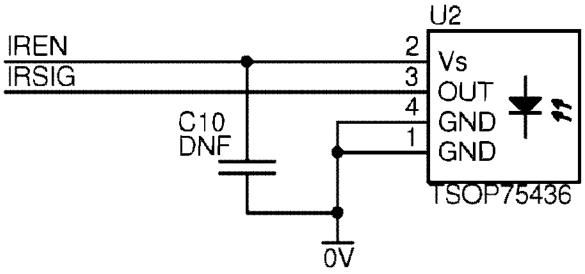

FIG. 5C shows connection of IRSIG and IREN of pins 6 and 7 of the microcontroller U3 with an infra-red receiver module U2 such that the microcontroller U3 may be controlled via infra-red signals.

Figure 5D:
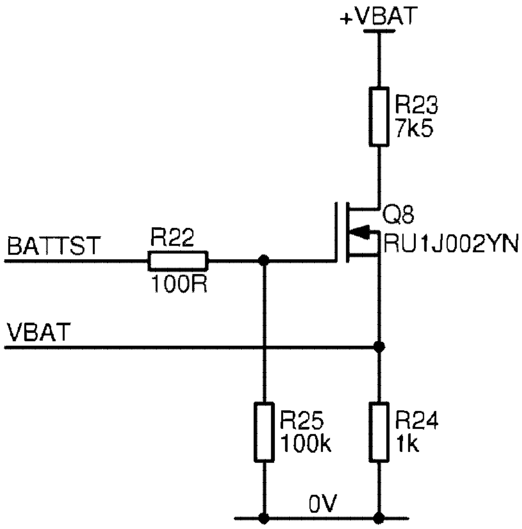

FIG. 5D shows connection of BATTST and VBAT of pins 10 and 9 of the microcontroller U3 with the +VBAT battery voltage from FIG. 5B in order to monitor the status of the battery.

Figure 5E:
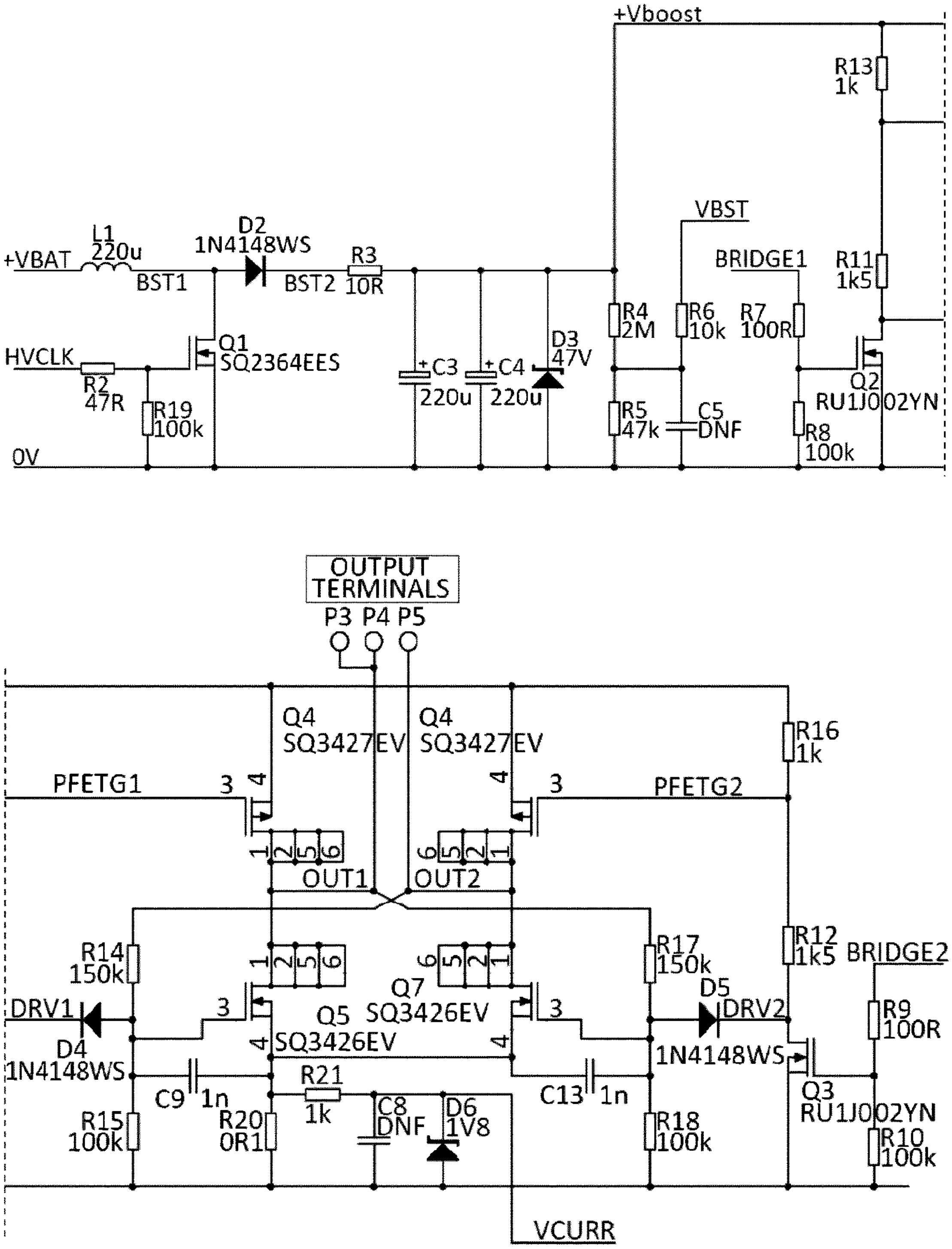

FIG. 5E shows a circuit that is powered by +VBAT from FIG. 5A, via FIG. 5D. Connection of the circuit with VCURR and HVCLK of pins 8 and 11 of the microcontroller U3 are also shown.

The invention claimed is:

1. A device for reducing depredation of fish by sharks, the device comprising:

a waterproof housing;

a power source within the housing;

a first electrode disposed on an exterior of the housing at a first end of the housing;

a second electrode disposed on the exterior of the housing at a second end of the housing opposite the first end of the housing; and a controller powered by the power source and configured to supply a sequence of electrical pulses between the first electrode and the second electrode when the device is in an active state, wherein each electrical pulse in the sequence of electrical pulses is spaced from each adjacent pulse by at least 3 seconds, wherein the device is configured to enter the active state when water is detected, and wherein the device is configured to enter a power-conservation state in which only a watchdog timer is operated when, for a period of time, no water is detected, no control signal is detected, and a state of the power source is acceptable.

2. The device for reducing depredation of fish by sharks of claim 1, wherein each electrical pulse has a duration of between 1.5 ms and 5 ms.

3. The device for reducing depredation of fish by sharks of claim 1, wherein each electrical pulse has a voltage between 20V and 40V.

4. The device for reducing depredation of fish by sharks of claim 1, wherein the second electrode is spaced from the first electrode by between 8 cm and 20 cm.

5. The device for reducing depredation of fish by sharks of claim 1, further comprising a pair of water contact pins in electrical communication with the controller and arranged to project out of the waterproof housing to provide projecting ends of the pair of water contact pins such that water present between the projecting ends of the pair of water contact pins completes an electrical circuit causing device to activate.

6. The device for reducing depredation of fish by sharks of claim 5, wherein the first and second electrodes comprise the pair of water contact pins.

7. A method of reducing depredation of fish by sharks, the method comprising:

providing the device according to claim 1;

entering, by the device, the active state in which the sequence of electrical pulses is supplied between the first electrode and the second electrode, wherein each electrical pulse in the sequence of electrical pulses is spaced from each adjacent pulse by at least 3 seconds when water is detected; and entering, by the device, the power-conservation state in which only the watchdog timer is operated when, for the period of time, no water is detected, no control signal is detected, and the state of the power source is acceptable.

* * * * *